US012671586B2

(12) United States Patent (10) Patent No.: US 12,671,586 B2

Oh et al. (45) Date of Patent: Jun. 30, 2026

(54) METHOD AND APPARATUS FOR PROVIDING DIFFERENTIAL SECURITY SERVICES FOR SHIP NETWORKS USING USER AUTHENTICATION-BASED PACKET CLASSIFICATION

(71) Applicant: Penta Security Inc., Seoul (KR)

(72) Inventors: Jin Hyeok Oh, Gwangmyeong-si (KR); Keon Yun, Seoul (KR); Sang Min Lee, Seoul (KR); Hee Sun Yun, Seoul (KR); Min Chul Kim, Seoul (KR); Myong Cheol Lim, Seoul (KR); Sang Gyoo Sim, Seoul (KR); Tae Gyun Kim, Yongin-si (KR)

(73) Assignee: Penta Security Inc., Seoul (KR)

( * ) Notice: Subject to any disclaimer, the term of this patent is extended or adjusted under 35 U.S.C. 154(b) by 149 days.

(21) Appl. No.: 18/596,559

(22) Filed: Mar. 5, 2024

(65) Prior Publication Data

US 2025/0193010 A1 Jun. 12, 2025

(30) Foreign Application Priority Data

Dec. 6, 2023 (KR) ......................... 10-2023-0176093

(51) Int. Cl.
*H04L 9/32* (2006.01)

(52) U.S. Cl.
CPC .................................. *H04L 9/3213* (2013.01)

(58) Field of Classification Search
CPC .............. H04L 9/3213; H04L 63/0807; H04L 63/0815; H04L 63/104; H04L 63/105; G06F 21/335; H04W 12/084
See application file for complete search history.

(56) References Cited

U.S. PATENT DOCUMENTS

| | | | | |
|---|---|---|---|---|
| 10,585,682 | B2 * | 3/2020 | Jain | ......................... G06F 9/451 |
| 11,122,028 | B2 * | 9/2021 | Yabe | ..................... H04L 9/3213 |

(Continued)

FOREIGN PATENT DOCUMENTS

| | | |
|---|---|---|
| EP | 4184866 A1 | 5/2023 |
| JP | 2018-163616 A | 10/2018 |

(Continued)

OTHER PUBLICATIONS

Hardt, Dick, "The OAuth 2.0 Authorization Framework", Internet Engineering Task Force, ISSN: 2070-1721, XP015084115, https://datatracker.ietf.org/doc/html/rfc6749, Oct. 2012.

(Continued)

*Primary Examiner* — J. Brant Murphy
(74) *Attorney, Agent, or Firm* — BROADVIEW IP LAW, PC

(57) ABSTRACT

A method of providing differential security services for a ship network by a service provider connected to a client performing the differential security services may comprise: receiving a service request from a user terminal by an authentication performing unit of a service provider including a processor; returning or issuing, by the authentication performing unit, an ID token and an authentication code to the user terminal in response to the service request; receiving, by the client, the ID token and the authentication code from the user terminal; verifying, by the client, validity of the ID token; setting, by the client, a session cookie for the service request when the validity is verified; transmitting, by the client, an access token request including the authentication code to a token issuing unit of the service provider; and receiving, by the client, an access token from the token issuing unit.

17 Claims, 12 Drawing Sheets

(56) References Cited

U.S. PATENT DOCUMENTS

| | | | |
|---|---|---|---|
| 11,140,146 B2 * | 10/2021 | Suraparaju | H04L 63/0807 |
| 2018/0278603 A1 * | 9/2018 | Yabe | H04L 63/08 |
| 2019/0057204 A1 * | 2/2019 | Marcovecchio | H04L 67/146 |
| 2019/0372962 A1 * | 12/2019 | Maria | H04L 63/108 |
| 2020/0213297 A1 * | 7/2020 | Suraparaju | H04L 63/0892 |
| 2023/0164134 A1 * | 5/2023 | Yun | H04L 63/102 |
| | | | 726/10 |
| 2025/0184731 A1 * | 6/2025 | Hu | H04W 12/10 |

FOREIGN PATENT DOCUMENTS

| | | | |
|---|---|---|---|
| JP | 2019-531534 A | 10/2019 | |
| JP | 2020-126602 A | 8/2020 | |
| JP | 2023-76798 A | 6/2023 | |

OTHER PUBLICATIONS

Sakimura, N., "OpenID Connect Core 1.0 incorporating errata set 1", International Telecommunication Union, vol. 3/20, XP044240175, http://openid.net/specs/openid-connect-core-1_0.html, Jan. 2018.
International Electrotechnical Commission, "Maritime navigation and radiocommunication equipment and systems—Data interfaces—Part 2: Secure communication between ship and shore (SECOM)", IEC 63173-2, ISBN: 9782832238028, XP082056291, https://api.iec.ch/harmonized/publications/download/2934126, May 2022.
Stefanov, Aleksandar, "Back to basics—OAuth 2.0 and OpenID Connect", XP093160623, https://aztoso.com/security/oauth2-and-openidconnect/, May 2020.

* cited by examiner

FIG. 9
80
| Class tag | priority |
|-----------|----------|
| 0 | – |
| 1 | 1 |
| 2 | 2 |
| 3 | 3 |
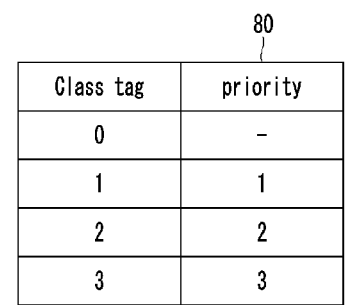
PROCESS PACKET ~S90
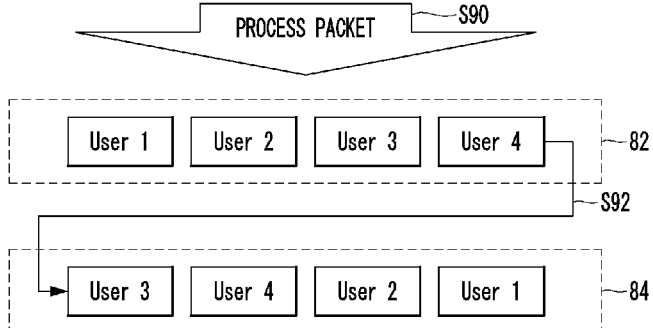
| User 1 | User 2 | User 3 | User 4 | ~82
~S92
| User 3 | User 4 | User 2 | User 1 | ~84

"iss": https://server.example.com,
    "sub": "24400320",
    "aud": "s6BhdRkqt3",
    "exp": 1311281970,
    "iat": 1311280970,
    "email": jane@example.com

```
HTTP/1.1 200 OK
    Content-Type: application/json;charset=UTF-8
    Cache-Control: no-store
    Pragma: no-cache
    {
            "access_token":"2YotnFZFEjr1zCsicMWpAA",
        "token_type":"bearer",
        "expires_in":3600,
        "refresh_token":"tGzv3JOkF0XG5Qx2TlKWIA",
        "scope":"create"
        "user_class":1
        "class_info":3                        ⎯98
        "constraint":"location:boston"
    }
```

METHOD AND APPARATUS FOR PROVIDING DIFFERENTIAL SECURITY SERVICES FOR SHIP NETWORKS USING USER AUTHENTICATION-BASED PACKET CLASSIFICATION

CROSS-REFERENCE TO RELATED APPLICATIONS

This application claims priority to Korean Patent Application No. 10-2023-0176093, filed on Dec. 6, 2023, with the Korean Intellectual Property Office (KIPO), the entire contents of which are hereby incorporated by reference.

BACKGROUND

1. Technical Field

Example embodiments of the present disclosure relates to a technology for providing differential security services for ship networks, and more particularly, to a method and apparatus for providing differential security services for ship networks capable of building a ship-only security system using user authentication-based packet classification.

2. Related Art

Autonomous ships using cutting-edge digital technologies and artificial intelligence are being introduced in shipbuilding and maritime and shipping port fields. The need to provide a security system for the introduction of autonomous ships is recently increasing rapidly.

In addition, the need for cyber security is rapidly increasing due to the increase in various network connections and information sharing between ships and land, and between major systems within ships. For example, the severity of damage from marine accidents is six times more than that of road traffic accidents, and there is a risk of secondary damage in the sea, providing an evacuation area in the event of an accident. In particular, cyber attacks on operation technology (OT) systems have increased 900% since 2017, and cyber attacks across the maritime industry have quadrupled from February to May 2020.

In addition, due to the nature of ships, cyber security equipment is operated with limited resources, so the need for researches on security systems optimized for ships is rapidly increasing. That is, due to the nature of ships sailing for a certain period of time, a cyber security system should be operated with limited network equipment and resources. In addition, in order to use a cyber security gateway, which is conventionally used on land, in ship networks, there is a need to improve efficiency of the cyber security gateway.

In addition, the ship networks need to consider the convergence of evolving next-generation security technology services. That is, the scope of application of the next-generation security technology is expanding from a network layer to an application layer in one security product, so there is a need to provide complex integrated security services rather than a single service, but not all network packets need to use all security services.

Therefore, the need to provide differential security services for each user class is increasing in networks for specific purposes or in specific areas, such as ship networks. In this case, there is a need to not only control system access rights but also provide differential networks and security services based on security classes, sensitivities, sources, etc., of packets. For example, there is an emerging need to improve inefficiency of redundant checks for repeated access to an initially permitted address.

SUMMARY

Example embodiments of the present disclosure provide a method and apparatus for providing differential security services for ship networks using user authentication-based packet classification capable of effectively providing the differential security services for each user class in the ship networks.

Example embodiments of the present disclosure also provide method and apparatus for providing differential security services for ship networks using open authorization (OAuth) capable of not only simply controlling system access rights but also effectively providing differential networks and security services based on security classes, sensitivities, sources, etc., of packets.

Example embodiments of the present disclosure also provide a method and apparatus for providing differential security services for ship networks capable of effectively improving inefficiency of redundant checks for repeated access to an initially permitted address through an expanded user authentication process.

According to an exemplary embodiment of the present disclosure, a method of providing differential security services for a ship network may comprise: receiving a service request from a user terminal by a first module; returning or issuing an ID token and an authentication code to the user terminal in response to the service request; receiving, by a second module, the ID token and the authentication code from the user terminal; verifying, by the second module, validity of the ID token; setting, by the second module, a session cookie for the service request when the validity is verified; transmitting, by the second module, an access token request including the authentication code to a third module of the service provider; and receiving, by the second module, an access token from the third module.

The first module is an authentication performing unit, the second module is a client, and the third module is a token issuing unit.

According to another exemplary embodiment of the present disclosure, a method of providing differential security services for a ship network by a service provider connected to a client performing the differential security services may comprise: receiving a service request from a user terminal by an authentication performing unit of a service provider including a processor; returning or issuing, by the authentication performing unit, an ID token and an authentication code to the user terminal in response to the service request; receiving, by the client, the ID token and the authentication code from the user terminal; verifying, by the client, validity of the ID token; setting, by the client, a session cookie for the service request when the validity is verified; transmitting, by the client, an access token request including the authentication code to a token issuing unit of the service provider; and receiving, by the client, an access token from the token issuing unit.

The method may further comprise: transmitting, by the client, a resource request, which includes the access token and has an authenticated header, to a resource server of the service provider.

The method may further comprise: confirming, by the resource server, whether access to the resource is correct according to a scope specified by a user of the user terminal in the access token.

The method may further comprise: receiving, by the client, a response message including resource information or access information to the resource information from the resource server.

The method may further comprise: transmitting a service response to the service request to the user terminal in response to the response message.

The user terminal may be located inside the ship network, or the user terminal may be located outside the ship network.

The method may further comprise: adding, by the authentication performing unit, an additional field or a claim to a payload of the ID token when issuing the ID token.

The claim may include a specific field for setting a unique identifier to identify a user of the user terminal.

The method may further comprise: obtaining, by the client, user information through the specific field included in the payload.

The method may further comprise, when the validity is verified, generating, by the client, a user class management table corresponding to a current session based on a pre-stored user class management table.

The user class management table may be shared with a security gateway (G/W) of the ship network.

The access token may include an expanded parameter, the expanded parameter may include fields for a user class and priority, and the fields for the user class and priority may define an action according to a return value of a class tag in the user class management table.

According to yet another exemplary embodiment of the present disclosure, an apparatus for providing differential security services for a ship network may comprise: an authentication performing unit that receives a service request from a user terminal and returns or issues an ID token and an authentication code to the user terminal in response to the service request; and a client that receives the ID token and the authentication code from the user terminal, verifies validity of the ID token, sets a session cookie for the service request when the validity is verified, transmits an access token request including the authentication code to a token issuing unit, and receives an access token from the token issuer.

The apparatus may further comprise a resource server, wherein the client transmits a resource request, which includes the access token and has an authenticated header, to the resource server, and the resource server confirms whether access to the resource is correct according to a scope specified by a user of the user terminal in the access token.

The client may receive a response message including resource information or access information to the resource information from the resource server, and transmit a service response to the service request to the user terminal in response to the response message.

The authentication performing unit may add an additional field or a claim to a payload of the ID token when issuing the ID token.

The claim may include a specific field for setting a unique identifier to identify a user of the user terminal.

When the validity is verified, the client may generate a user class management table corresponding to a current session based on a pre-stored user class management table, and the user class management table may be shared with a security G/W of the ship network.

The access token may include an expanded parameter, the expanded parameter may include fields for a user class and priority, and the fields for the user class and priority may define an action according to a return value of a class tag in the user class management table.

According to the present disclosure, it is possible to effectively provide the differential security services for each user class in the ship networks.

In addition, according to the present disclosure, it is possible to not only simply control the system access rights but also effectively provide the differential networks and security services based on the security classes, sensitivities, sources, etc., of the packets.

In addition, according to the present disclosure, it is possible to effectively improve the inefficiency of redundant checks for repeated access to the initially permitted address through the expanded user authentication process.

In addition, according to the present disclosure, by improving the OAuth-based authentication method of the existing technology, that is, by using the access token through the expansion of the user authentication function, it is possible to effectively differentially grant authorities to various services in the ship networks through the user authentication-based packet classification without the direct user authentication.

In addition, according to the present disclosure, by verifying the ID token and then granting the authorization by adding the OpenID Connect-based user authentication method, it is possible to provide the differential security services that cannot be disguised even if attackers steal other user's access tokens.

In addition, according to the present disclosure, by allowing the client to generate the user session after verifying the ID token or providing the services to connect to the already generated session using the user information, it is possible to effectively provide the differential security services in the ship networks.

In addition, according to the present disclosure, it is possible to efficiently manage the user class management table to provide the differential security services. In particular, by allowing the specific class management table to be applied only to the specific users, it is possible for the service provider to easily manage the user class management table. In addition, by using the sub claim of the ID token to perform the process of confirming that the user class management table matches the inquired information and then granting the authorization, it is possible to efficiently manage the differential security services.

In addition, according to the present disclosure, when the new user is generated or the existing user account is set again, by generating the new user class management table and inserting the sub claim issued through the ID token, it is possible to perform all the security checks by specifying the class field of the class management table to the specific value, and by allowing the service provider to change the field value after the security check, it is possible to efficiently provide the differential security services.

BRIEF DESCRIPTION OF DRAWINGS

FIG. 2 is a diagram for describing a network separation structure of the ship network of FIG. 1.

FIG. 7 is a diagram illustrating an access token that may be used in the apparatus for providing differential security services for ship networks according to another embodiment of the present disclosure.

FIG. 8 is an exemplary diagram illustrating a ship network of the apparatus for providing differential security services using the access token of FIG. 7.

FIG. 9 is a diagram for describing a main operating principle of the apparatus for providing differential security services for ship networks in FIG. 8.

FIG. 11 is an exemplary diagram for describing the ID token that may be employed for the OIDC-based SSO authentication in the present embodiment.

FIG. 12 is an exemplary diagram of expanded parameters for a user class management that may be employed for the OIDC-based SSO authentication in the present embodiment.

DETAILED DESCRIPTION OF THE EMBODIMENTS

Figure 1:
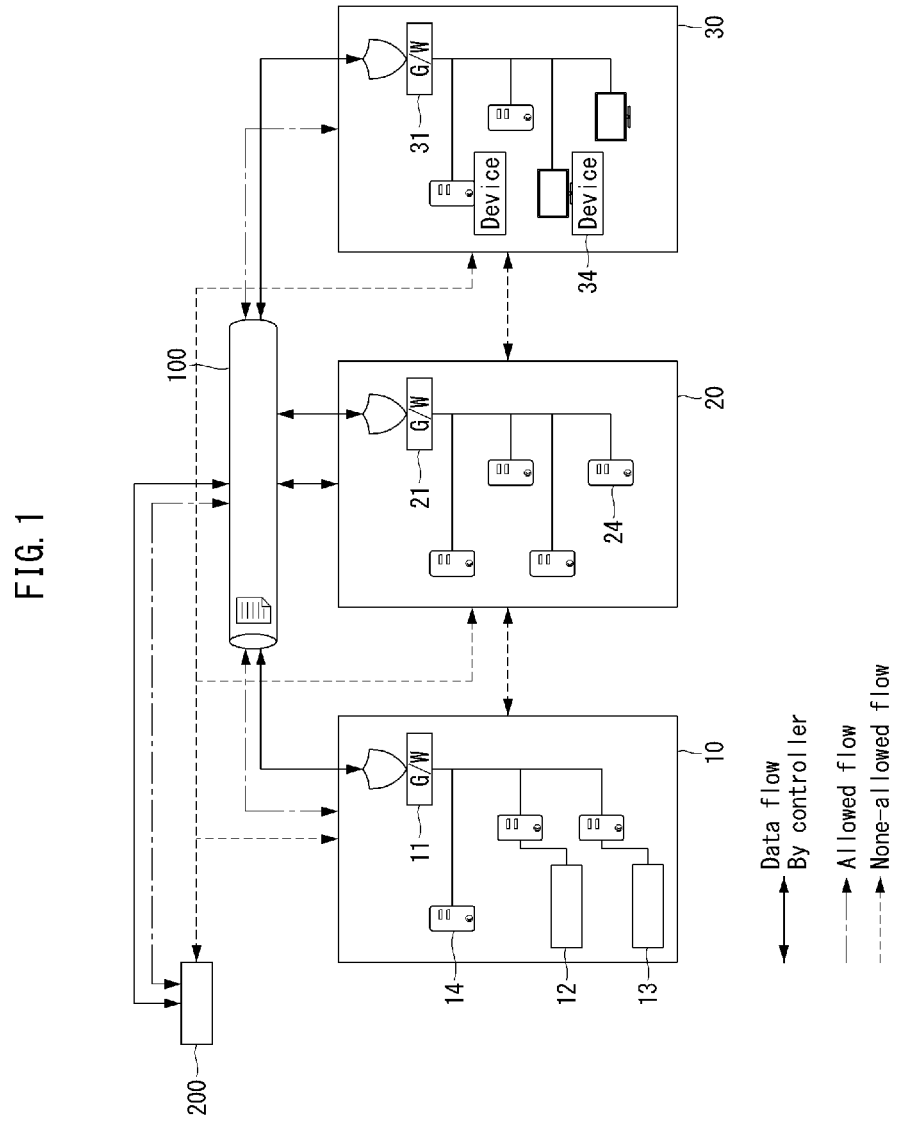
FIG. 1 is a diagram for describing a ship network to which a method of providing differential security services according to an embodiment of the present disclosure may be applied.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a diagram for describing a ship network to which a method of providing differential security services according to an embodiment of the present disclosure may be applied.

Referring to FIG. 1, a method of providing differential security services may be implemented by a computing device that performs access control between sub-networks within a ship. The computing device may refer to an apparatus 100 for providing differential security services.

The sub-networks may include an operational technology (OT) network 10, an information technology (IT) network 20, a crew network 30, etc.

Each of the OT network 10, the IT network 20, and the crew network 30 may be connected to the apparatus 100 for providing differential security services through a corresponding one of gateways (G/W) 11, 21, and 31 and a user authentication-based network access control channel controlled by the apparatus.

The OT network 10 may include a first G/W 11, a plurality of user terminals 14, a sensor 12 connected to a specific user terminal, an actuator 13 connected to the specific user terminal, etc.

The IT network 20 may include a second G/W 21, a plurality of user terminals 24, etc.

The crew network 30 may include a third G/W 31, a plurality of user terminals 34, etc.

The method of providing differential security services for ship networks is implemented by a user authentication-based network security device to be able to control data traffic between the sub-networks existing within the ship, and the network security device may be applied to an upper stage of the sub-networks.

Specifically, the computing device or the apparatus 100 for providing differential security services implementing the method of providing differential security services for ship networks may control access through mutual authentication when exchanging data between the OT network, the IT network, and the crew network.

In addition, the apparatus 100 for providing differential security services may control access to an external network 200 based on the user authentication when accessing the ship networks from an external network 200.

In addition, the apparatus 100 for providing differential security services may deny access to data traffic for which connection is not permitted based on the user authentication.

In FIG. 1, a data flow by a processor or controller of the apparatus 100 for providing differential security services is indicated by a solid line, and an allowed flow in which connection is permitted by the controller is indicated by a single-dash dotted line, and a none-allowed flow in which connection is not permitted by the controller is indicated by a double-dash dotted line.

Figure 2:
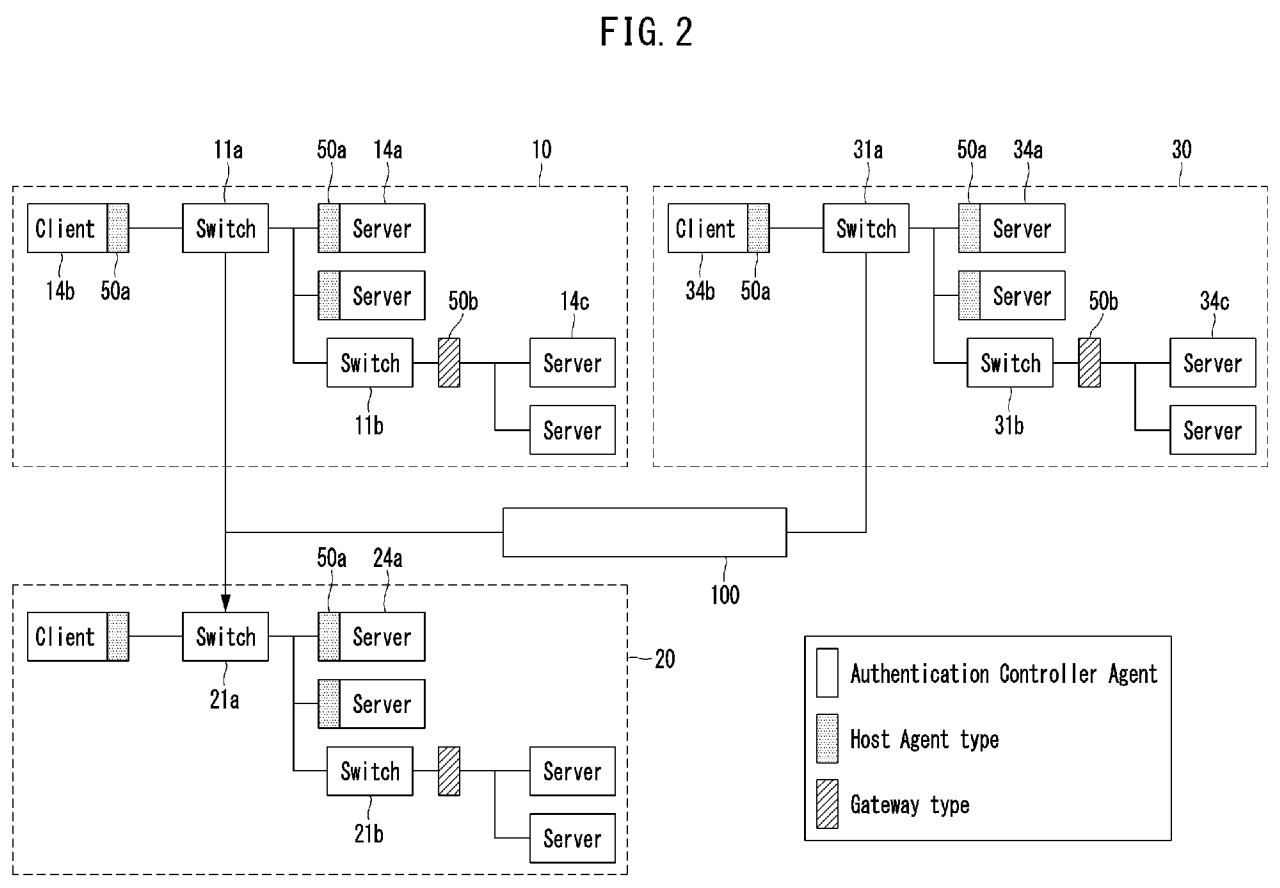

FIG. 2 is a diagram for describing a network separation structure of the ship network of FIG. 1.

Referring to FIG. 2, the apparatus 100 for providing differential security services for ship networks may separate the sub-networks 10, 20, and 30 through an authentication controller agent. The authentication controller agent may include a first agent 50a of a host agent type and a second agent 50b of a G/W type.

The sub-networks may be connected to each other through first switches (S/Ws) 11a, 21a, and 31a installed in each network.

The first agent 50a may refer to a server agent when installed on server devices 14a, 24a, and 34a, and may refer to a user agent when installed on user devices 14b and 34b.

The second agent 50b may be installed in server devices 14c and 34c in which the first agent 50a is not installed on the server device or user device, or at rear ends of each of the second S/Ws 11b, 21b, and 31b of each sub-network 10, 20, and 30 for the security of the user devices.

In this way, the apparatus 100 for providing differential security services for ship networks according to the present embodiment may separate the sub-networks 10, 20, and 30 through the authentication controller agent, and effectively perform access control between the sub-networks 10, 20, and 30 and between the sub-networks 10, 20, and 30 and the network.

Figure 3:
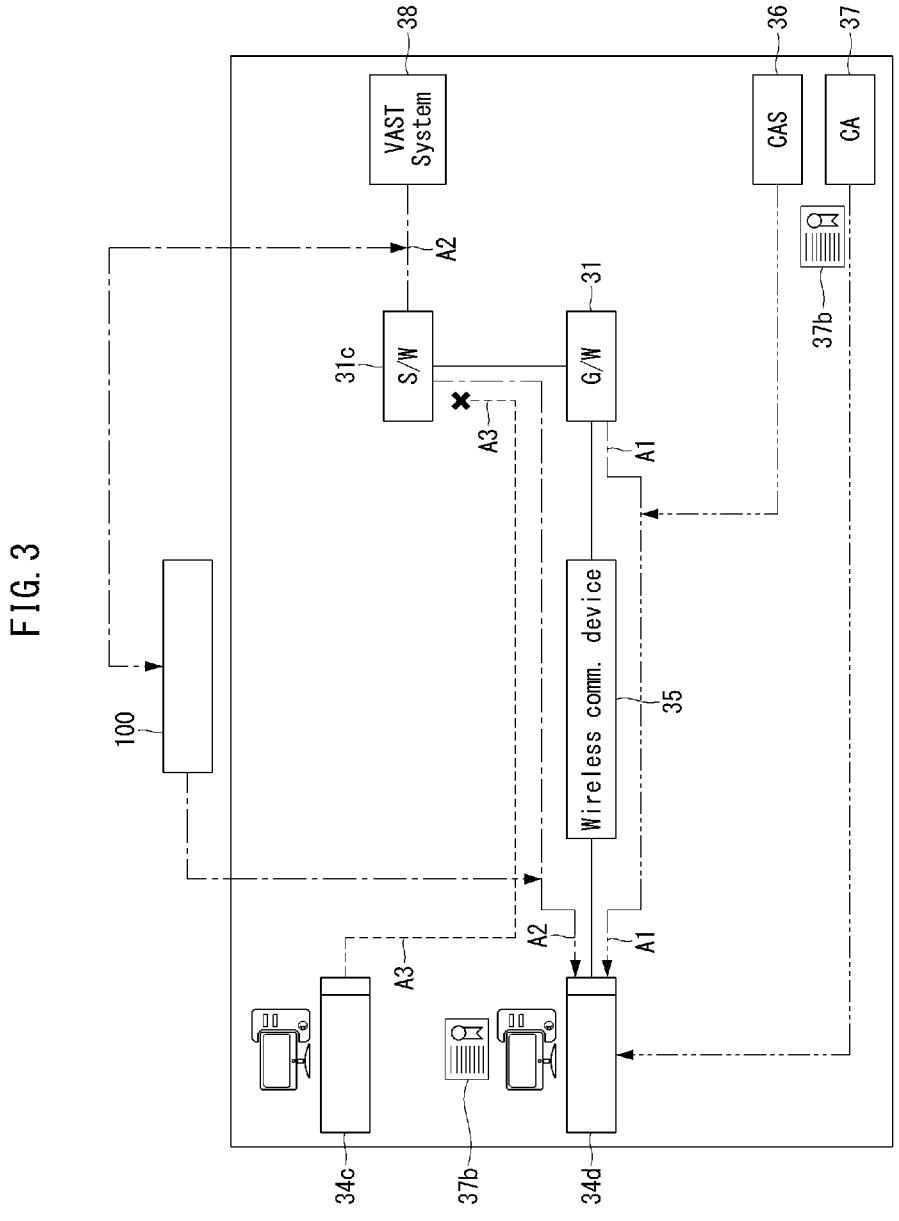
FIG. 3 is a diagram for describing an operating principle of the method of providing differential security services for ship networks in FIG. 1.

FIG. 3 is a diagram for describing an operating principle of the method of providing differential security services for ship networks in FIG. 1.

Referring to FIG. 3, the apparatus 100 for providing differential security services may control access A1 between an authentication device 34d and the G/W 31 through a central authentication service (CAS) server 36. The authentication device 34d may be mounted in the server device, the user device, etc. In addition, the first agent may be installed in the authentication device 34d.

In this case, the apparatus 100 for providing differential security services may authenticate the authentication device 34d using a public key certificate 37b of the authentication device 34d registered in a certificate authority (CA) 37 and permit access to the G/W 31 through a wireless local area network (LAN) or an internal network. The wireless LAN may be formed by a wireless communication device 35.

In addition, the apparatus 100 for providing differential security services may support external communication A2 to allow the authentication device 34d to access a VAST system 38, such as an external network, a database management system, a storage server, and a web server, through the G/W 31 and the S/W 31c based on the certificate such as the public key certificate 37b. The VAST system 38 may include a storage system or a data platform manufactured by VAST Data, Inc. Also, the VAST system 38 can refer to an approach to a data-intensive computing that serves as the comprehensive software infrastructure for capturing, cataloging, refining, enriching, or storing data through real-time deep data analytics and deep learning.

Meanwhile, the apparatus 100 for providing differential security services may be controlled to block the external communication and restrict access to the unauthenticated device 34c when the unauthenticated device 34c in the sub-network such as the crew network attempts to access A3 the external network through the G/W 31 or the S/W 31c. The unauthenticated device 34c may be the user device or server device on which the first agent is installed, may be the user device or a server device on which the first agent is not installed, or may be any terminal that is not confirmed within the ship.

According to the present embodiment, access for internal communication within the same network or external communication with an external network may be effectively controlled.

Figure 4:
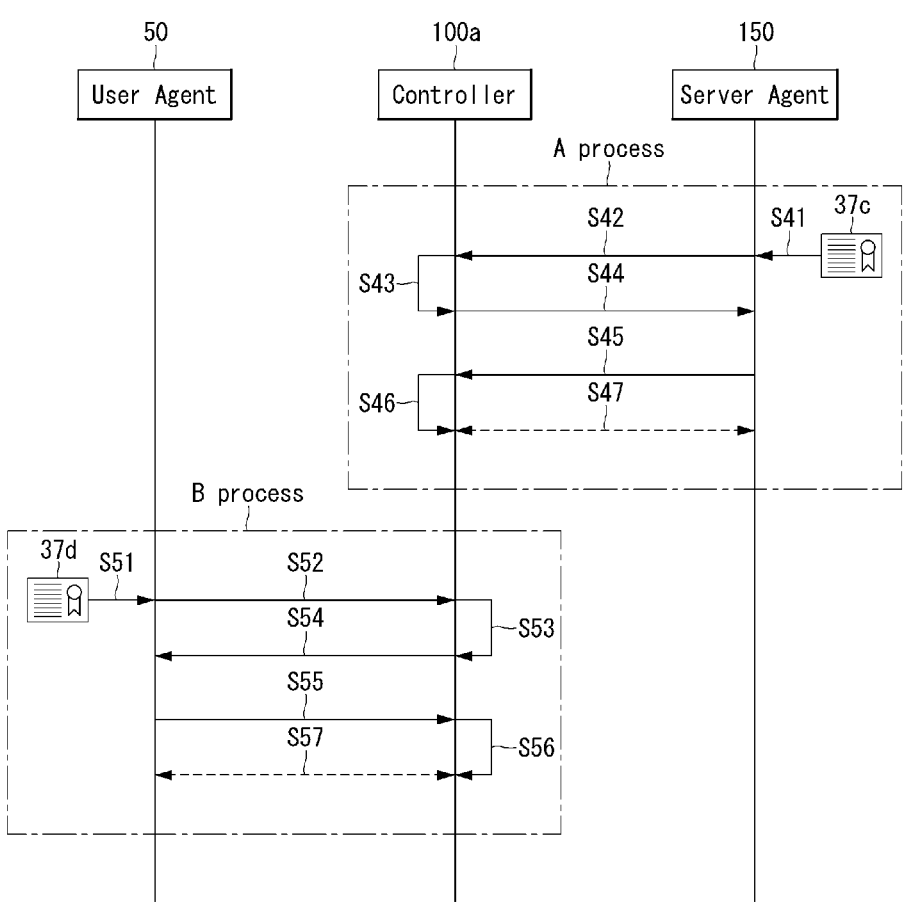
FIG. 4 is a flowchart illustrating a registration procedure between an agent and a controller that may be employed in the method of providing differential security services for ship networks in FIG. 1.

FIG. 4 is a flowchart illustrating a registration procedure between an agent and a controller that may be employed in the method of providing differential security services for ship networks in FIG. 1.

Referring to FIG. 4, a server agent 150 connected to a controller 100a of the apparatus for providing differential security services through a wired and/or wireless network may transmit a registration request message for registration of the server agent 150 to the controller 100a of the apparatus for providing differential security services based on a first certificate 37c (S41 and S42).

Next, the controller 100a may verify validity of the certificate 37c received through the registration request message (S43) and transmit registration information to the server agent 150 for confirmation of the server agent 150 (S44). Here, the registration information may include a public key (KEYSA) of the server agent, a unique identification value or unique identifier that may identify the server agent 150, an access token, etc. The access token may refer to a value used to verify whether authorization to access a resource has been granted.

Next, the server agent 150 may transmit a connection request message to the controller 100a based on the registration information received from the controller 100a (S45).

Next, the controller 100a may verify the registration information by receiving the connection request message (S46), and transmit service information, which can be provided from the server agent 150, to the server agent 150 in order to perform a mutual authentication protocol with the server agent 150 (S47).

As the mutual authentication protocol, at least one of transport layer security (TLS) or any other mutual authentication-based network encryption protocol corresponding to the TLS may be used. The service information may include an internet protocol (IP), a port, a service identifier (service ID), etc.

The above-described operations S41 to S47 are registration procedures performed between the controller 100a and the server agent 150 and may refer to a first process (A process) or a server agent registration process.

Meanwhile, a user agent 50 connected to the controller 100*a* of the apparatus for providing differential security services through a wired and/or wireless network may transmit a registration request message for registration of the user device to the controller 100*a* of the apparatus for providing differential security services based on a second certificate 37*d* (S51 and S52).

Next, the controller 100*a* may verify validity of the second certificate 37*d* received through the registration request message (S53) and transmit the registration information to the user agent 50 for confirmation of the user agent 50 (S54). Here, the registration information may include a key, a unique identification value or unique identifier that may identify the user agent 50, an access token, etc.

Next, the user agent 50 may transmit the connection request message to the controller 100*a* based on the registration information received from the controller 100*a* (S55).

Next, the controller 100*a* may verify the registration information by receiving the connection request message (S56), and transmit service information, which can be provided from the user agent 50, to the user agent 50 in order to perform mutual authentication with the user agent 50 (S57). The mutual authentication may use the TLS or other mutual authentication-based network encryption protocols corresponding to the TLS. The service information may include the IP, the port, the service ID, etc.

The above-described operations S51 to S57 are registration procedures performed between the controller 100*a* and the server agent 50 and may refer to a second process (B process) or a server device agent registration process.

According to the present embodiment, the registration procedure between the controller and the agent registers the information of each agent in the controller to allow access to agents separated from each other, thereby effectively performing network access control with high security. In particular, a connection process for subsequent network access may be performed only after the registration process is successfully completed, so the access control on the ship network may be effectively performed.

Figure 5:
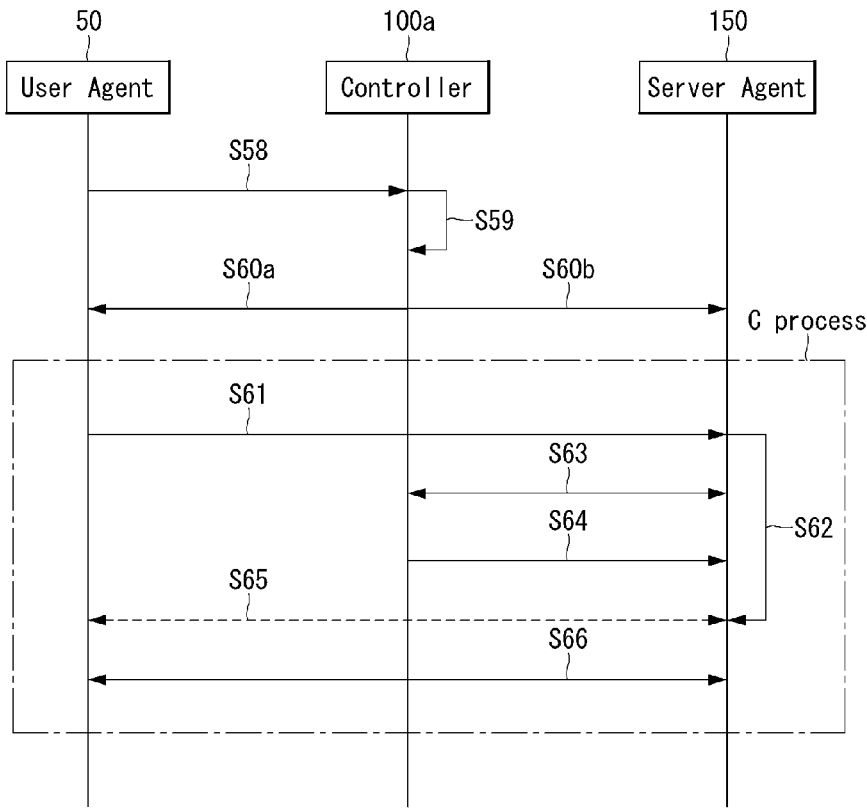
FIG. 5 is a flowchart for describing a connection procedure between the agent and the controller that may be employed in the method of providing differential security services for ship networks in FIG. 1.

FIG. 5 is a flowchart for describing a connection procedure between the agent and the controller that may be employed in the method of providing differential security services for ship networks in FIG. 1.

Referring to FIG. 5, the user agent 50 that has completed the registration process may receive information about the server agent 150, to which the user agent 50 wants to connect over the network, through the controller 100*a*. That is, through the above-described registration procedure, the controller 100*a* may share the information about the server agent 150 that the user agent 50 wants to access.

Then, the user agent 50 may perform the mutual authentication with the server agent 150 through the connection procedure and the connection through the network.

Specifically, the user agent 50 may request the information about the server agent 150, to which the user agent 50 wants to connect via the network, from the controller 100*a* (S58).

Next, the controller 100*a* may first confirm the authorization of the user agent 50 in response to the connection request message from the user agent 50 (S59). Here, the controller 100*a* may apply network separation according to a location or network location of the server agent 150 that the user agent 50 wants to access.

Next, the controller 100*a* may transmit server information or a list of server agents about the server agents, which the user agent 50 may access, to the user agent 50 through a connection response message, etc., corresponding to a connection request message (S60*a*).

In this case, the controller 100*a* may not transmit registration confirm information used in the registration procedure of the user agent 50 to the user agent 50 by including the registration confirm information in the connection response message, but transmit new registration confirm information to be used in the connection procedure to the user agent 50 by including the new registration confirm information in the connection response message.

Here, the controller 100*a* may transmit the connection response message to the user agent 50 and also transmit the new registration confirm information to the server agent 150 that the user agent 50 wants to access (S60*b*). The new registration confirm information may refer to new authentication information of existing registration confirm information.

Next, the user agent 50 may transmit the connection request message to the server agent 150 based on the server information or the server agent list received from the controller 100*a* (S61). The connection request message may include the new registration confirm information.

Here, the server agent 150 may confirm the new registration confirm information received from the user agent 50 based on the new registration confirm information previously received from the controller 100*a*, but the present disclosure is not limited thereto. The server agent 150 may be configured to request the new registration confirm information from the controller 100*a* in response to the connection request message from the user agent 50 (S62), receive the new registration confirm information from the controller 100*a* through a response message (S63), and then confirm the new registration confirm information received from the user agent 50 based on the new registration confirm information received from the controller 100*a*. In this way, when confirming the authentication information of the user agent 50, the server agent 150 may select one of the above two methods to perform the verification.

Next, the server agent 150 may verify information required for connection with the user agent 50 based on the new registration confirm information (S64) and perform the mutual authentication protocol procedure with the user agent 50 (S65).

When the mutual authentication protocol procedure is completed, the user agent 50 may be connected to the server agent 150 through the user authentication for the server device, so the user device and the server device transmit and receive signals and data between each other (S66).

Figure 6:
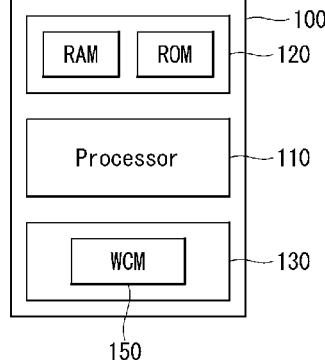
FIG. 6 is a schematic block diagram of an apparatus for providing differential security services for ship networks according to another embodiment of the present disclosure.

FIG. 6 is a schematic block diagram of an apparatus for providing differential security services for ship networks according to another embodiment of the present disclosure.

Referring to FIG. 6, an apparatus 100 for providing differential security services for ship networks may include at least one processor 110, a memory 120, and a transceiver 130 that is connected to a network and performs communication. At least one processor 110 and memory 120 may be configured as at least one controller.

The transceiver 130 may include a sub-communication system supporting a wired network or a wireless communication module (WCM) 150 supporting a wireless network.

In addition, the apparatus 100 for providing differential security services may further include an input interface device, an output interface device, a storage device, etc. Each component included in the apparatus 100 for providing differential security services may be connected by a bus and communicate with each other.

However, each component included in the apparatus 100 for providing differential security services may be connected through an individual interface or individual bus centered on the processor 110, other than a common bus. For example, the processor 110 may be connected to at least one of the memory 120, the transceiver 130, the input interface device, the output interface device, and the storage device through a dedicated interface.

The processor 110 may execute program commands stored in at least one of the memory 120 and the storage device. The processor 110 may mean a central processing unit (CPU), a graphics processing unit (GPU), or a dedicated processor on which the methods according to the embodiments of the present disclosure are performed. The program command may include at least one command for implementing the method of providing differential security services for ship networks.

Each of the memory 120 and the storage device may include at least one of a volatile storage medium and a non-volatile storage medium. For example, the memory 120 may include at least one of read only memory (ROM) and random access memory (RAM).

Figure 7:
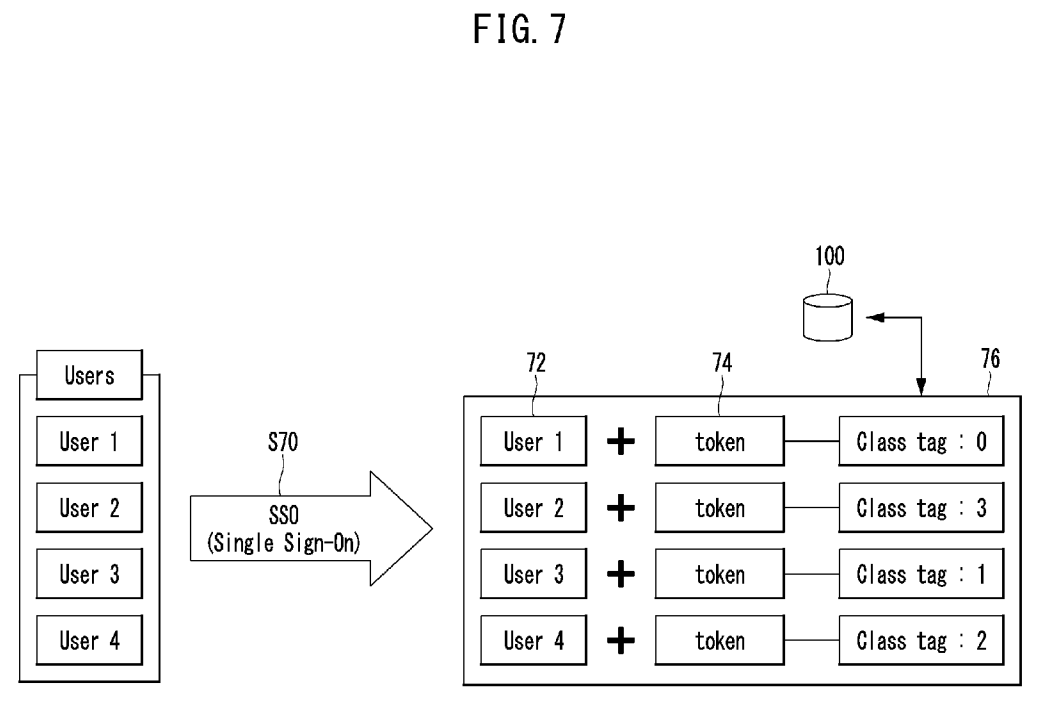
Figure 8:
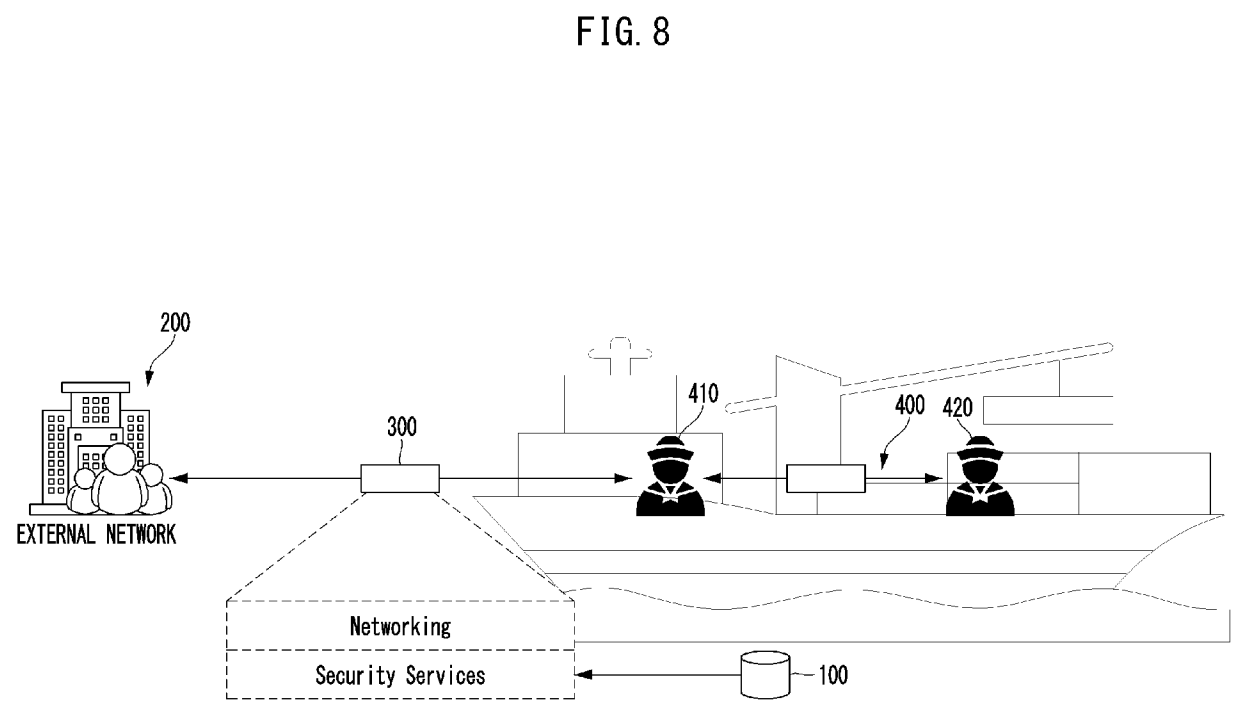

FIG. 7 is a diagram illustrating an access token that may be used in the apparatus for providing differential security services for ship networks according to another embodiment of the present disclosure. FIG. 8 is an exemplary diagram illustrating a ship network of the apparatus for providing differential security services using the access token of FIG. 7.

Referring to FIG. 7, the apparatus 100 for providing differential security services may authenticate a user through openID connect (OIDC)-based single sign-on (SSO) authentication for a user terminal (S70). In addition, the apparatus 100 for providing differential security services may perform integrated user authentication for a plurality of users using OIDC-based user authentication. The SSO may refer to single account login, single authentication, integrated authentication, etc.

The above-described user terminal may include a desktop computer, a portable terminal, a laptop, a personal portable communication terminal, etc., and may be simply referred to as users. The users may include a first user (user 1) belonging to a first sub-network of the ship network, a second user (user 2) belonging to a second sub-network of the ship network, a third user (user 3) belonging to a third sub-network of the ship network, and a fourth user (user 4) belonging to an external network outside the ship network.

After the user authentication is completed, the apparatus 100 for providing differential security services may grant an access token 74 to a user 72 for whom user authentication has been completed. Here, the user 72 may include a user terminal or an identifier of the user terminal. In addition, the apparatus 100 for providing differential security services may grant a class tag to a user authentication-based packet to which the access token 74 has been granted. The class tag may include class values or separators such as 0, 1, 2, or 3.

The apparatus 100 for providing differential security services may be configured to manage and process user packets 76 tagged with the class tag through the access token 74 based on open authorization (OAuth).

The OAuth includes OAuth 2.0. The OAuth 2.0 is an open standard protocol for granting authorization using the access tokens. The access token is set to allow the use of resources within the scope permitted by users, and may include permission information on authorization as an arbitrary string value.

As illustrated in FIG. 8, the apparatus 100 for providing differential security services may perform and manage networking for the connection between sub-networks 410 and 420 within the ship network 400 or the connection between the sub-network and the external network 200, security services, etc.

The apparatus 100 for providing differential security services may function as at least one 300 of a firewall (FW), an intrusion detection system (IDS), an intrusion prevention system (IPS), etc. that monitors the network and transmits a warning about potential threats to a network manager. The at least one 300 may be a security G/W of the ship network.

In particular, the apparatus for providing differential security services may provide differential security services using user authentication-based packet classification.

FIG. 9 is a diagram for describing a main operating principle of the apparatus for providing differential security services for ship networks in FIG. 8.

Referring to FIG. 9, the apparatus for providing differential security services may provide differential security services according to the class tag 80 in the user packet transmitted in the network while monitoring the network. That is, when all the user packets sequentially pass through multiple services, the apparatus for providing differential security services may confirm the information of the corresponding class tag at a router or S/W and process whether the user packets are authenticated or passed.

For example, the priority for each class tag is illustrated in Table 1 below.

TABLE 1

| Class Tag | Priority |
| --- | --- |
| 0 | — |
| 1 | 1 |
| 2 | 2 |
| 3 | 3 |

According to Table 1, when the class tag is 0 (class tag: 0), no specified priority may exist, when the class tag is 1 (class tag: 1), the specified priority may be first or 1, when the class tag is 2 (class tag: 2), the specified priority may be second or 2, and when the class tag is 3 (class tag: 3), and the specified priority may be third or 3.

In the case described above, the apparatus for providing differential security services may provide the differential security service through packet classification when processing packets received in a certain unit of time. For example, when a set of packets 82 including a first user (user 1) packet, a second user (user 2) packet, a third user (user 3) packet, and a fourth user (user 4) packet in a certain unit of time is input in the listed order, the apparatus for providing differential security services may change a data processing order based on a priority queue (S90 and S92).

That is, when each user packet has a priority queue as illustrated in FIG. 7, the apparatus for providing differential security services may change a data processing order of user packets 84 to process the packets in the order listed such as the third user packet, the fourth user packet, the second user packet, and the first user packet (S92).

Meanwhile, according to another embodiment of the present disclosure, the apparatus for providing differential security services for ship networks may be configured to perform the openID connect (OIDC)-based single sign on (SSO) authentication.

First, the OIDC is set as follows. The OIDC may refer to an authentication layer generated using the OAuth which is an authorization protocol. The OIDC may refer to Open ID linkage or Open ID-based authentication.

The OAuth may include the OAuth 2.0 as a standard protocol that may allow a third-party client to receive delegated authorization from users to access specific user data on various online platforms such as KakaoTalk, Google, Facebook, and Twitter. That is, in the OAuth 2.0, the authorization server is a server that authenticates a resource owner and issues an access token to a client, and the resource server may refer to a server having resources such as KakaoTalk, Google, Facebook, and Twitter. The authentication server and resource server may be composed of separate servers, but are not limited thereto and may be composed of one server.

The above-described third-party client, or simply the client, may refer to the differential security services of the present embodiment, or may refer to the apparatus for providing differential security services.

The access token may refer to a token set to use resources within the scope permitted by the user. The access token issued by the OAuth is a token that temporarily grants a specific authorization, and does not include user information.

In the present embodiment, the function of the access token is expanded and utilized. That is, the OIDC may be configured to be responsible for authentication at an upper layer of the OAuth 2.0 protocol. Therefore, the apparatus for providing differential security services may be configured to utilize the OIDC to allow the client to verify user's identity and at the same time obtain basic user information.

In addition, in the present embodiment, the ID token is utilized. The ID token is a security token that includes user's authentication information configured in a JSON web token (JWT) format. The format of the ID token includes a header, a payload, and a signature. When obtaining the ID token, the apparatus for providing differential security services of the present embodiment may obtain user information encoded in a payload part and utilize the obtained user information to provide the differential security services to a user.

When authenticating the client, the OIDC of the present embodiment may be configured to operate in accordance with provisions of a standard document defining the use of the JWT to request the OAuth 2.0 access token. The standard document may include Internet Engineering Task Force (IETF) Request for Comments (RFC) 7523 and 6749 documents. The 6749 document defines an authorization framework of the OAuth 2.0.

The OAuth 2.0 may limit a scope of client access to user resources through the scope permitted by the user. An example of OIDC's ID token configured in the JWT format for this purpose is described below.

Figure 10:
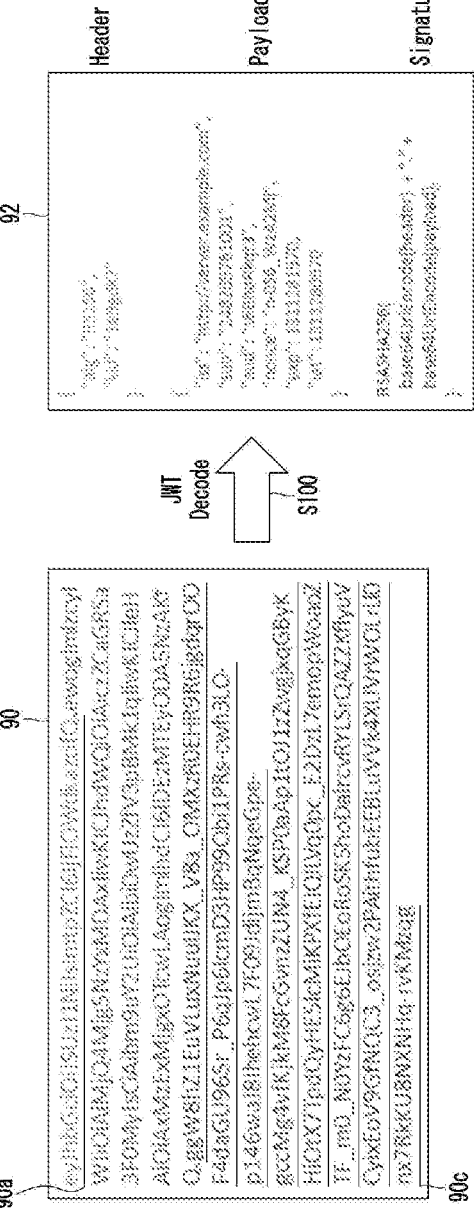
FIG. 10 is an exemplary diagram illustrating the ID token for the OIDC-based SSO authentication that may be employed in the apparatus for providing differential security services of the present embodiment.

FIG. 10 is an exemplary diagram illustrating the ID token for the OIDC-based SSO authentication that may be employed in the apparatus for providing differential security services of the present embodiment.

Referring to FIG. 10, when the OIDC receives a signal or message including an "openid" value in the scope permitted by the user of the OAuth 2.0, it may return information about the user authentication along with the access token in the JWT called the ID token.

As illustrated on the left side of FIG. 10, an OIDC JWT 90 corresponding to the ID token may have a first part 90a, a second part, and a third part 90c. The second part is a part disposed between the first part 90a and the third part 90c. That is, the ID token including the first to third parts may be composed of a single string form using a full stop as a separator. The first part may correspond to a header, the second part may correspond to a payload, and the third part may correspond to a signature.

When the OIDC JWT 90 is decoded (S100), a decoded ID token 92 composed of the header, payload, and signature may be confirmed as illustrated on the right side of FIG. 10.

FIG. 11 is an exemplary diagram for describing the ID token that may be employed for the OIDC-based SSO authentication in the present embodiment.

Referring to FIG. 11, the ID token is a JWT or JSON web token, and is also an encoded token including three types of information such as the header, the payload, and the signature. Accordingly, after obtaining an ID token 94, the apparatus for providing differential security services may determine or set whether the client obtains the encoded user information in the payload part.

The apparatus for providing differential security services may configure claims within the ID token to manage user authentication when issuing the ID token. The claims may have a plurality of fields or sub-claims.

Main claims are shown in Table 2 as follows.

TABLE 2

| Field | Description |
| --- | --- |
| iss(issuer) | Token issuer that has issued ID token |
| sub(subject) | Unique identifier to identify users |
| aud(audience) | ID of client requesting token |
| exp(expiration time) | Expiration time of token |
| iat(issued at) | Time token is issued |

As shown in Table 2, the main claims include iss, sub, aud, exp, and iat, and other values may be added to the claim field. Other values may include, for example, an email, an address, a phone number, etc.

In the main claims, iss represents a token issuer that has issued an ID token, sub represents a unique identifier to identify a user, aud represents a client requesting a token, that is, differential security services or identification (ID) of the apparatus for providing differential security services, exp represents an expiration time of the ID token, and iat represents the time when the ID token has been issued.

The apparatus for providing differential security services may authenticate users based on first information about the token issuer recorded in an "iss" field in the received ID token 94, that is, "https://server.example.com" and second information about the email address recorded in an "email" field, that is, "jane@example.com".

According to the present embodiment, the apparatus for providing differential security services or the differential security services that the apparatus provides may effectively authenticate users using the client information of the ID token.

The apparatus for providing differential security services of the present embodiment may expand the differential security service by granting user authorization using expanded parameters in addition to the ID token described above.

FIG. 12 is an exemplary diagram of expanded parameters for a user class management that may be employed for the OIDC-based SSO authentication in the present embodiment.

When the authentication server or authorization grant server issues a valid access token or ID token based on the OAuth 2.0, if a response parameter expansion is defined in the corresponding token, the apparatus for providing differential security services may be configured to perform the user class management according to the definition of the expanded response parameter.

Here, the authentication server or authorization grant server may be implemented as a G/W of a ship network or at least part of a server device or user device connected to the G/W.

More specifically, as illustrated in FIG. 12, a response message 96 includes an expanded parameter 98, and the expanded parameter 98 may include an item for user_class and an item for class_info, and an item for constraints.

In the present embodiment, the user class may include an identifier indicated as a priority, such as the number 1, the class information may include an identifier indicating an internal specific sub-network, such as the number 3, and the constraints may include an identifier indicating a client's location in a restricted area or an accessible area, or information such as !location: boston related to the identifier, but is not limited thereto.

The main fields of the above-described expanded parameter 98 are shown in more detail as expanded parameters listed in Table 3 below.

TABLE 3

| Field | Description |
|---|---|
| user class | User class and priority<br>In user class management table defined by authorization<br>grant server, definition of action according to return<br>value of class tag |
| class info | Version information of user class management table<br>Support management of whether to update class<br>according to latest class management table,<br>with version information of user class<br>management table determined by class value |
| constraint | Constraints requiring additional compliance<br>Definition of constraints that require additional<br>compliance in addition to user class<br>information defined in user class |

According to the present embodiment, by further using the expanded parameters, it is possible to more effectively operate and manage the security services differentially depending on the user class in the security G/W that provides multiple security services such as UTM ( ) or through the security G/W.

Figure 13:
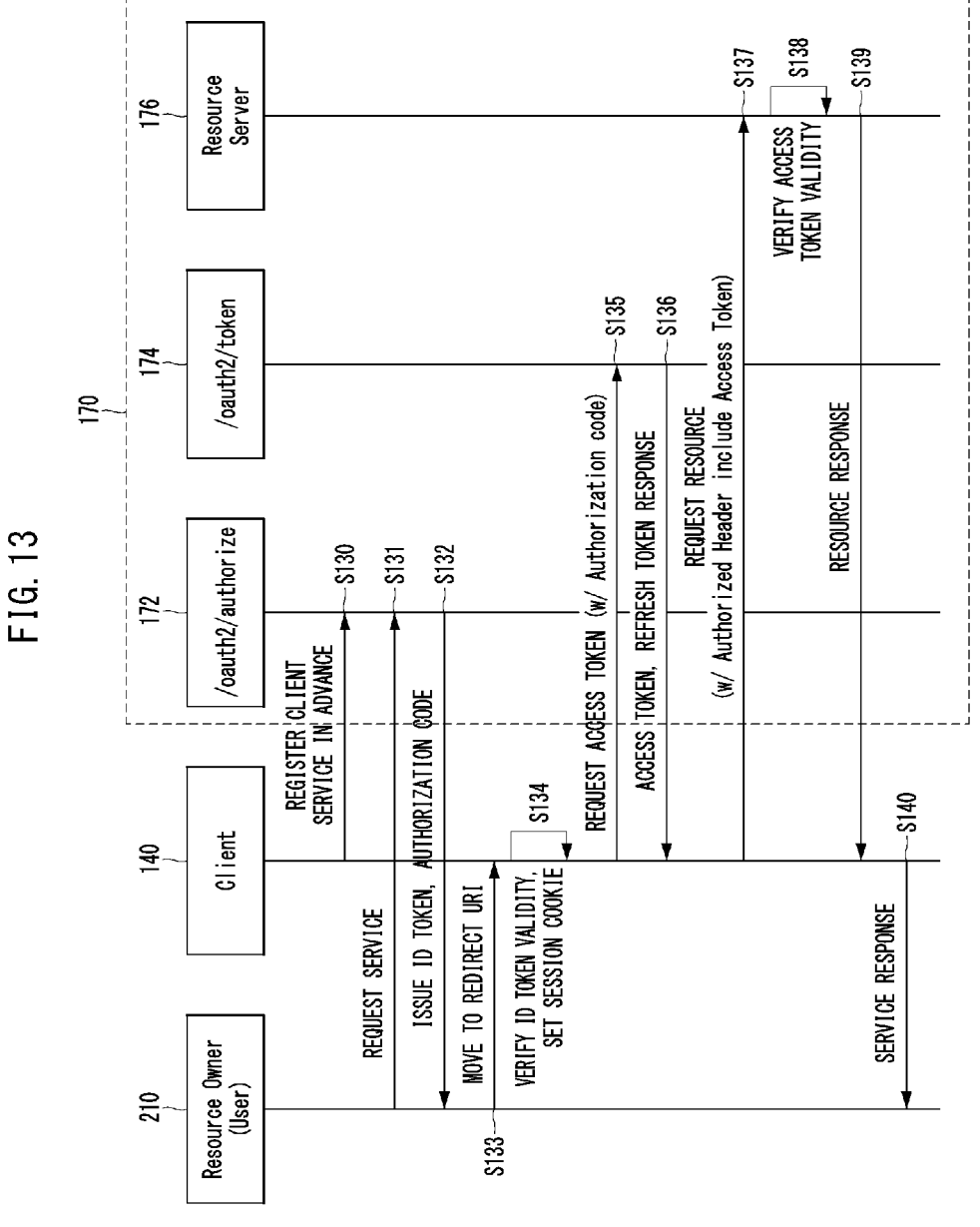
FIG. 13 is a flowchart for describing the OIDC-based SSO authentication in the present embodiment.

FIG. 13 is a flowchart for describing the OIDC-based SSO authentication in the present embodiment.

The OIDC-based SSO authentication process of the apparatus for providing differential security services for ship networks is described with reference to FIG. 13 as follows.

First, a client 140 may complete registration in advance to enable user authentication in order to use a service provider 170 (S130). The client 140 may refer to a means for providing differential complementary services through user authentication-based packet classification in a ship network or a component that performs a function corresponding to such means. Furthermore, a base of the client 140 may include any one of a variety of existing online services that may include the differential complementary services.

Upon the completion of the registration, the client 140 may receive information such as a client ID, a client password (or client secret), a user class management table, etc., required for the user authentication from the service provider 170. Here, the service provider 170 may refer to an OpenID provider or an OpenID authentication service provider.

Next, when using the client 140, a user 210 may request access authorization or request services from the service provider 170, particularly, an authentication performing unit 172 corresponding to at least a part of the authentication server or authorization grant server, through the required authentication screen, such as logging in or entering an authentication number (S131). That is, the authentication performing unit 172 includes the OAuth 2.0-based authorization server and may receive a service request from the user 210 through the OAuth 2.0 protocol.

Here, the user 210 may refer to a resource owner and may include a user terminal. The user terminal may be a first node, a first server, or a first communication terminal that is located on the ship network, or may be a fourth node, a fourth server, or a fourth communication terminal on an external network that is located outside the ship network.

After completing the user authentication, the authentication performing unit 172 of the service provider 170 may return the ID token and the authorization code to the user. In this case, the ID token may include a digital signature, or simply a signature.

Next, the user 210 moves to a location indicated by a redirect uniform resource identifier (URI), and in this process, the ID token may be transmitted to a client 14 (S133). That is, the client 140 may receive the ID token from the user 210 moving through the redirect URI.

Next, the client 140 may verify the validity of the ID token (S134). In addition, the client 140 may set a corresponding session cookie (S134). In this operation, the client 140 may verify the signature of the ID token using a public key of the token issuer included in the ID token. This process may perform user authentication with differential classes based on the user class management table in the process of verifying the validity of the ID token to operate the differential security services.

In this case, the client 140 may verify the signature of the ID token using the public key of the token issuer included in the ID token.

In addition, the client 140 may check whether the token was issued by a trustworthy authentication server through the "iss" claim in the payload part of the ID token.

In addition, the client 140 may verify that the "aud" claim matches the client's own identifier. This means verifying that the token has been issued for the corresponding client.

In addition, the client 140 may inquire the user class management table using the "sub" claim. The user class management table may store user information linked to the unique identifier of the user 210. It may be confirmed whether the user information inquired from the user class management table matches the information in the "sub" claim. When the information matches, the client 140 may consider the user to be authenticated by the authentication server.

Meanwhile, when the user class management table is not defined in the "sub" claim, the client 140 may newly generate the new class management table and then add the "sub" claim to the ID token. In this case, the class tag in the class management table may be set to 0. When the class tag is set to 0, the client 140 may perform all preset security checks on the user 210 accessing the ship network.

Here, a "sub (subject)" claim value may always have the same value for the same user when it is issued by the same authentication server or authentication performing unit 172 in the OIDC protocol. The "sub" claim is a unique identifier for the user 210 and may be used to consistently identify user 210 within the authentication server.

In addition, when the verification of the user 210 is completed through the ID token, the client 140 may operate to maintain the user in the authenticated state by generating a session for the user 210.

Next, the client 140 may request the access token from a token issuing unit 174 (S135). In this case, the parameters included in the access token request include, but are not limited to, the authorization code, and may be configured to further include at least one selected from a client ID, a client secret, etc. The token issuing unit 174 may include an OAuth 2.0-based token server.

Next, the token issuing unit 174 may issue the access token to provide the differential security services and transmit a refresh token response including the issued access token to the client 140 (S136). The access token may refer to the refresh token that means a refreshed token.

Next, the client 140 may request a resource from a resource server 176 through the issued access token (S137). The resource request message has an authorized header and may include the access token.

Next, the resource server 176 may verify the validity of the access token received from the client 140 (S138) and confirm whether the access to the corresponding resource is correct according to the scope specified by the user in the access token.

Then, the resource server 176 may provide, to the client 140, the response message including information about resource information, access information to the resource information, or whether access to the resource information is possible (S139). The response message may refer to a resource response or a resource response message.

Next, the client 140 may transmit the service response to the service request to the user 210 based on the resource information acquired according to the resource response (S140).

According to the above-described configuration, when issuing the valid ID token and the access token, the apparatus for providing differential security services may define the user class management table through the response parameter of the authentication performing unit 172 corresponding to the authorization grant server to provide the differential security services.

In this case, the service provider 170, for example, a ship network manager, may define the following contents in advance to manage the user accessing the network. That is, the authorization grant server may define the class management table to manage an access control level of the user. In addition, the authorization grant server may prepare and use a list of specific users that do not require separate security checks.

In addition, the service provider 170 may prepare a class table based on an internet protocol address (IP address), a port number, a protocol, etc., according to preset security requirements.

Class management fields of the class management table that the service provider 170 of the present embodiment may employ are listed in Table 4 below.

TABLE 4

| Field | Description | Example |
|---|---|---|
| subject | Unique identifier to identify users | 24400320 |
| source address | Source address scope | x.x.x.0~x.x.x.255 |
| source port | Source port scope | 80 |
| destination address | Destination address scope | x.x.x.0~x.x.x.255 |
| destination port | Destination port scope | 80 |
| protocol | Transport protocol type | TCP |
| class | Class tag to indicate user class | 1 |
| priority | Priority of corresponding traffic | 1 |
| action | Definition of actions for each | Firewall, |

TABLE 4-continued

| Field | Description | Example |
|---|---|---|
| | class, such as type of security service to be performed on corresponding traffic | IDS, IPS, etc. |

Referring to Table 4, registration management fields may include information about a subject, a source address, a source port, a destination address or destination address, a destination port or destination port, a protocol, a class, a priority, an action, etc.

Meanwhile, in the present embodiment, the client 14 is described as being limited to the differential security services and is described as having a form separated from the service provider 170 corresponding to the apparatus for providing differential security services, but the present disclosure is not limited to this configuration, and of course, the service provider 170 or the apparatus for providing differential security services may be configured to include the client 14.

In addition, in the present embodiment, the service provider 170 has a form that it integrally includes the authentication server including the authentication performing unit 172 and the token issuing unit 174, but the present disclosure does not provide such a configuration, and of course, may be configured so that the authentication server is separated into a separate configuration and linked to the apparatus for providing differential security services including the resource server 176.

Figure 14:
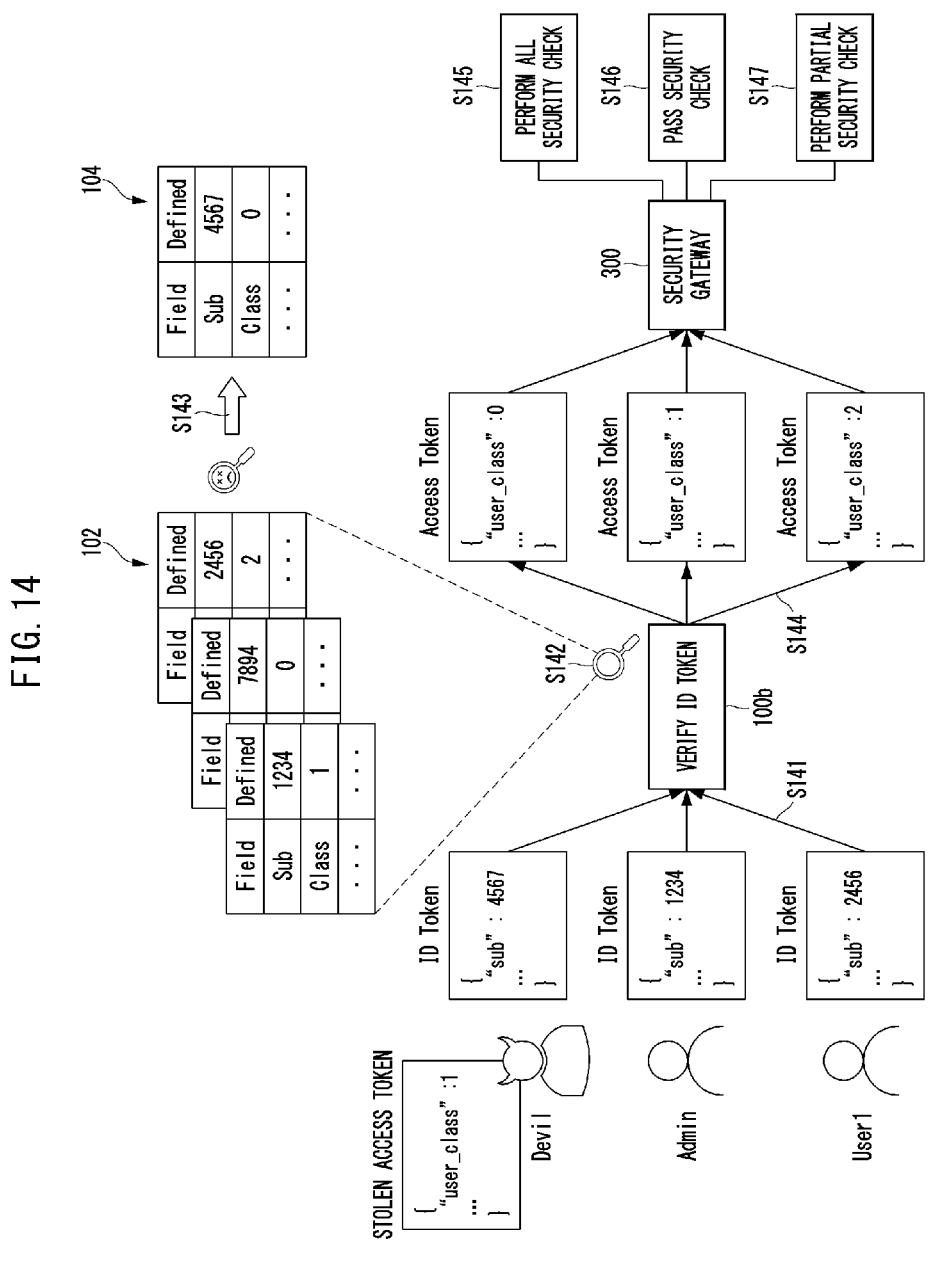
FIG. 14 is an exemplary diagram for describing the process of providing the OIDC SSO-based differential security services of FIG. 13.

FIG. 14 is an exemplary diagram for describing the process of providing the OIDC SSO-based differential security services of FIG. 13.

Referring to FIG. 14, the apparatus for providing OIDC SSO-based differential security services may provide the user authentication through the ID token and the differential security services for each user class through the access tokens based on the user authentication.

When an administrator (admin), the first user (user1), or a malicious user (devil) having an ID token accesses the ship network, the apparatus for providing differential security services may verify the corresponding ID token to block the malicious user access to the ship network. Here, the malicious user (devil) may be a user having a stolen access token.

Describing in more detail, when the access request or service request including the ID token is input from an administrator or users to a service provider 100b (S141), the authentication performing unit of the service provider 100b may verify the ID token (S142).

To verify the ID token, the service provider 100b may compare the information in the ID token with the information of the previously defined user class management table 102 and generate the user class management table 104 for the current traffic as a result of the comparison (S143). The user class management table 104 may be shared with a security G/W 300 of the ship network.

Next, the service provider 100b may issue the access token only for the service request for which the user verification has been completed (S144). Thereafter, the service provider 100b may provide the access token to the security G/W 300 of the ship network.

Accordingly, the security G/W 300 may differentially perform security monitoring actions such as performing all the security checks on packets of authenticated users transmitted between the ship networks according to the user class management table (S145), passing the security check (S146), or performing some security checks (S147).

According to the above-described embodiment, using the OIDC-based SSO authentication technology, the user authentication may be effectively performed by adding the ID token when requesting services. In addition, by using the user information that requested the authentication, that is, the subject claim of the ID token, in the user class management table for the differential security services, it is possible to effectively provide the differential security services. In addition, by comparing the subject claim of the ID token with the subject field of the user class management table during the user authentication process to perform the user authentication and granting the authorization, it is possible to significantly improve the efficiency of services.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of providing differential security services for a ship network by a service provider connected to a client performing the differential security services, the method comprising:

receiving a service request from a user terminal by an authentication performing unit of a service provider including a processor;

returning or issuing, by the authentication performing unit, an ID token and an authentication code to the user terminal in response to the service request;

receiving, by the client, the ID token and the authentication code from the user terminal;

verifying, by the client, validity of the ID token;

setting, by the client, a session cookie for the service request when the validity is verified;

transmitting, by the client, an access token request including the authentication code to a token issuing unit of the service provider; and receiving, by the client, an access token from the token issuing unit, wherein when the validity is verified, generating, by the client, a user class management table corresponding to a current session based on a pre-stored user class management table.

2. The method of claim 1, further comprising transmitting, by the client, a resource request, which includes the access token and has an authenticated header, to a resource server of the service provider.

3. The method of claim 2, further comprising confirming, by the resource server, whether access to the resource is correct according to a scope specified by a user of the user terminal in the access token.

4. The method of claim 3, further comprising receiving, by the client, a response message including resource information or access information to the resource information from the resource server.

5. The method of claim 4, further comprising transmitting a service response to the service request to the user terminal in response to the response message.

6. The method of claim 1, wherein the user terminal is located inside or outside the ship network.

7. A method of providing differential security services for a ship network by a service provider connected to a client performing the differential security services, the method comprising:

receiving, a service request from a user terminal by an authentication performing unit of a service provider including a processor;

returning or issuing, by the authentication performing unit, an ID token and an authentication code to the user terminal in response to the service request;

receiving, by the client, the ID token and the authentication code from the user terminal;

verifying, by the client, validity of the ID token;

setting, by the client, a session cookie for the service request when the validity is verified;

transmitting, by the client, an access token request including the authentication code to a token issuing unit of the service provider; and receiving, by the client, an access token from the token issuing unit, wherein the method further comprises adding, by the authentication performing unit, an additional field or a claim to a payload of the ID token when issuing the ID token.

8. The method of claim 7, wherein the claim includes a specific field for setting a unique identifier to identify a user of the user terminal.

9. The method of claim 8, further comprising obtaining, by the client, user information through the specific field included in the payload.

10. The method of claim 1, wherein the user class management table is shared with a security gateway (G/W) of the ship network.

11. The method of claim 10, wherein the access token includes an expanded parameter, the expanded parameter includes fields for a user class and priority, and the fields for the user class and priority define an action according to a return value of a class tag in the user class management table.

12. An apparatus for providing differential security services for a ship network, comprising:

an authentication performing unit that receives a service request from a user terminal and returns or issues an ID token and an authentication code to the user terminal in response to the service request; and a client that receives the ID token and the authentication code from the user terminal, verifies validity of the ID token, sets a session cookie for the service request when the validity is verified, transmits an access token request including the authentication code to a token issuing unit, and receives an access token from the token issuing unit, wherein, when the validity is verified, the client generates a user class management table corresponding to a current session based on a pre-stored user class management table, and wherein the user class management table is shared with a security gateway (G/W) of the ship network.

13. The apparatus of claim 12, further comprising a resource server, wherein the client transmits a resource request, which includes the access token and has an authenticated header, to the resource server, and wherein the resource server confirms whether access to the resource is correct according to a scope specified by a user of the user terminal in the access token.

14. The apparatus of claim 13, wherein the client receives a response message including resource information or access information to the resource information from the resource server, and transmits a service response to the service request to the user terminal in response to the response message.

15. The apparatus of claim 12, wherein the authentication performing unit adds an additional field or a claim to a payload of the ID token when issuing the ID token.

16. The apparatus of claim 15, wherein the claim includes a specific field for setting a unique identifier to identify a user of the user terminal.

17. The apparatus of claim 12, wherein the access token includes an expanded parameter, the expanded parameter includes fields for a user class and priority, and the fields for the user class and priority define an action of a security service according to a return value of a class tag in the user class management table.

* * * * *